July 18, 1961
B. W. NELSON ET AL
2,992,954
PROCESS FOR MAKING ELECTRIC COMMUTATORS
Filed Jan. 10, 1957
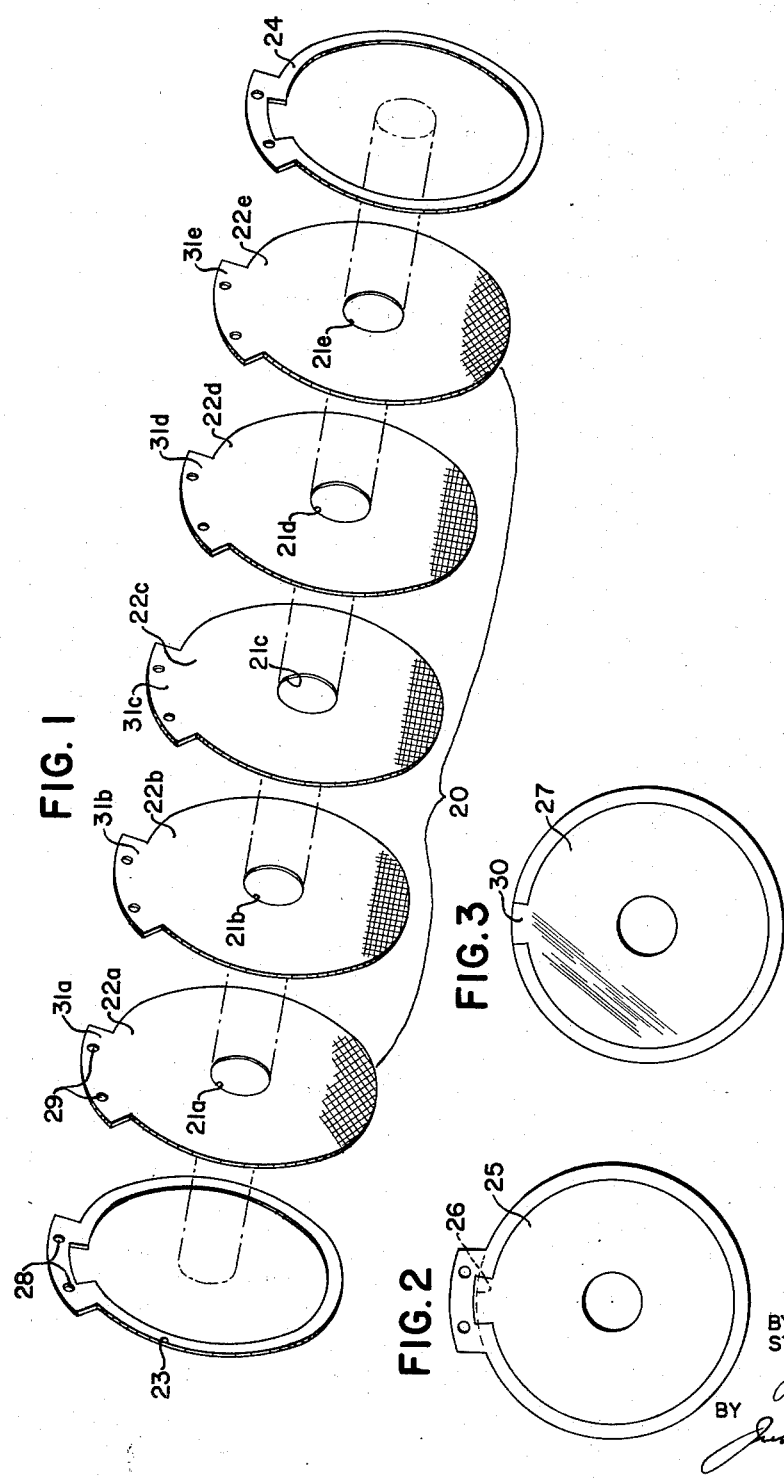
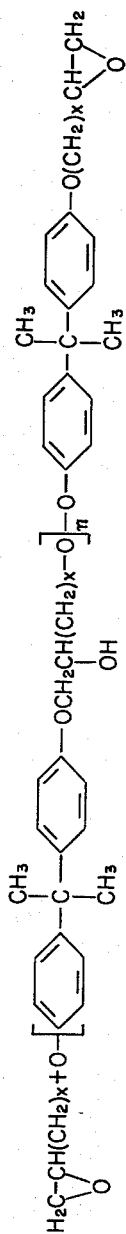
INVENTORS
BYRON W. NELSON &
STEPHEN D. MARCEY
BY
THEIR ATTORNEYS ём
United States Patent Office 2,992,954
Patented July 18, 1961

2,992,954
PROCESS FOR MAKING ELECTRIC COMMUTATORS

Byron W. Nelson, Miamisburg, and Stephen D. Marcey, Dayton, Ohio, assignors to The National Cash Register Company, Dayton, Ohio, a corporation of Maryland
Filed Jan. 10, 1957, Ser. No. 633,433
1 Claim. (Cl. 154—80)

This invention relates to an electric commutator of plate-like shape, having embedded, flush with the faces thereof, electrically conductive tracks, and to a method of making such a commutator. In the preferred embodiment, disk-shaped commutators are provided with electrically conductive tracks embedded flush with the surfaces on the circumferential edges, although the tracks may be anywhere on the flat surfaces or only on one surface.

A chief object of the invention is to make such a commutator in which the electrically conductive tracks are flush with the disk faces, which otherwise are non-conductive and resistant to scarring by arcing. Along the electrically conductive tracks are intervals where the track is broken, and consequently any circuit connected by the tracks is broken if the contacts happen to be on such a non-conductive interval. Most insulating molding materials are subject to carbonization when subjected to arcing, and in repeatedly breaking an applied circuit, the non-conducting material would be apt to be damaged at the places where the wipers or contacts pass the end of the track onto the non-conducting surfaces. Therefore, electrically non-conductive epoxy resin material of the general structure shown in FIG. 4 of the drawings, and which is resistive to damage by arcing, is specified. These epoxy resins are thermo-setting.

In the method of manufacture, the disk is made up of laminate layers of epoxy resin impregnated material, or at least the outer laminations are of epoxy resin impregnated material. The epoxy resin is of the general structure:

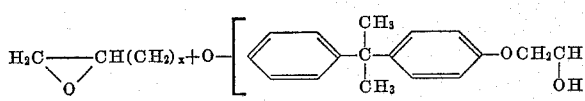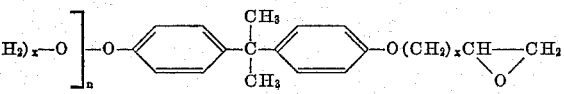

The central layers intermediate the outer layers may be made of less expensive and stronger materials. In the method of making such commutators, as is provided in this invention, only a single pressing and heat setting step is involved.

With these and other objects in view, the invention includes certain novel features of construction, processing steps, and combinations of parts, a preferred form or embodiment of which is hereinafter described, with reference to the drawing which accompanies and forms part of this specification.

In the drawing:
FIG. 1 is an exploded perspective view of the various components making up the preferred embodiment;
FIG. 2 shows the partially completed commutator, after the molding and curing operation, but before final trimming;
FIG. 3 shows the completed commutator;
FIG. 4, before referred to, is the general molecular formula for epoxy resins.

In the preferred form, the novel commutator is made of a plurality of disks of absorbent web material impregnated with the thermo-setting resin material, and of flat rings of an electrically conductive material cut from sheets thereof, the disks and rings being pressed together in a stack and cured by heat. The rings, of course, are on the outside of the stack, and in the pressing operation are pushed in flush with the outer faces of the outer disks.

More particularly, a number of irregular web-like supporting disks 20 (FIG. 1) of absorbent material impregnated with a "β" stage phase of the thermo-setting resin are cut to the same dimensions, each with a central aperture 21a to 21e, for mounting on an axle, and each having a circular periphery except for an extended sectoral portion 31a to 31e.

With regard to web material of disks 22b, 22c, and 22d, these are preferably made of glass cloth because of the inertness and inherent strength of such material. Substitutes for these materials are various absorbent papers, like filter paper, linen or cotton cloth, cloth made of synthetic material, or any other material of that nature which will not disintegrate upon application of the heat and pressure necessary to set the thermo-setting resins with which they are impregnated. The outer disks 22a and 22e have to be buffed flat on the outer surfaces after the fabricated unit comes from the press, in order that the surfaces to be smooth to reduce arcing, and the accumulation of electrically conductive dust thereon. For that reason it is preferable that fiberglass not be used in the outer disks.

The epoxy resins are preferred because of their lower coefficient of shrinkage but other thermo-setting arc resistant resins such as melamine-formaldehyde resins and the urea formaldehyde resins may be used if it is so desired. The base absorbent web used in disks 22a and 22e may be made of absorbent paper, which will readily finish smoothly in the grinding and buffing operation.

After the impregnated disks have been formed, they are stacked with the extended sectors matched and the axial holes 21 matched. Then the electrically conductive rings 23 and 24 are applied to the outer faces of the stack, after having previously applied thereto cement to hold them in alinement with disks 22a and 22e. The stack of elements is then placed in a hot press and cured at 325 degrees Fahrenheit for a period of approximately ten minutes, the pressure forcing the rings 23 and 24 flush with the outer faces of disks 22a and 22e. The disks are kept under pressure until cooled to handling temperature, whereupon they are removed from the press and subjected on their outer surfaces to a buffing operation, to remove flash and irregularities which may be present on the metal rings. The edges of each laminated and cured disk are also smoothed off to form the fabricated object 25 of FIG. 2. The extended sectoral portion extending outwardly from the dotted line 26 of FIG. 2 is then trimmed to make the finished product 27 of FIG. 3.

In order to give a good wearing surface to the circumferential electrically conductive tracks, they are plated with rhodium to the desired thickness. Phosphor bronze and beryllium copper are excellent materials for making the rings 23 and 24 which when plated form the electrically conductive paths, but other conductive materials may be used.

If it is desired to have the conductive tracks on both sides of the finished element electrically connected, the supporting material may be bored out slightly in one or more places around the periphery and a drop of solder inserted so there will be a bridging connection.

Although in the particular commutator shown there is only one gap in the circular circumferential electrically conductive tracks, it is perfectly obvious that two or more gaps may be made around the circumference, to suit the purposes needed.

It is also obvious that the invention extends beyond the use of circular disks, becouse the plate may be of any shape, such as oblong, rectangular, triangular, etc.

The center holes 21a, 21b, 21c, 21d, and 21e, and the holes 28 provided in each of the rings 23, and the holes 29 provided in each of the disks, are used as locating holes in the assembly of the structure into an arcuate formation during the pressing and curing operations.

While the methods and materials herein shown and described are admirably adapted to fulfill the objects primarily stated, it is to be understood that it is not intended to confine the invention to the exact form or embodiment herein disclosed, for it is susceptible of embodiment in various other forms.

What is claimed is:

The method of making a plate-like commutator, including the steps of forming a matched plurality of liquid absorbent webs of electrically non-conductive material impregnated with an electrically non-conductive thermo-setting epoxy resin in the "B" state; stacking the webs in matched relation; cementing electrically conductive material to the outer faces of the outer webs of the stack in the desired pattern; and pressing the stack on the conductive material thereon in a hot press, with sufficient pressure to embed the electrically conductive material flush with the outer surface and with sufficient heat to set the resin.

References Cited in the file of this patent

UNITED STATES PATENTS

| | | |
|---|---|---|
| 1,410,914 | Hartzell | Mar. 28, 1922 |
| 2,104,141 | Stevens | Jan. 4, 1938 |
| 2,423,869 | Blessing | July 15, 1947 |
| 2,456,381 | Clark | Dec. 14, 1948 |
| 2,680,700 | Meyers | June 8, 1954 |
| 2,694,028 | Rapp | Nov. 9, 1954 |
| 2,807,867 | Camprubi | Oct. 1, 1957 |
| 2,838,436 | Clingman | June 10, 1958 |

OTHER REFERENCES

"Ethoxylines," Electrical Manufacturing (July 1949), pages 78–81, 164 and 166.

"Epoxies—No Wonder," Modern Plastics (October 1952), pages 89–94.

UNITED STATES PATENT OFFICE
CERTIFICATE OF CORRECTION

Patent No. 2,992,954                                July 18, 1961

Bryon W. Nelson et al.

It is hereby certified that error appears in the above numbered patent requiring correction and that the said Letters Patent should read as corrected below.

Column 1, line 30, for "non-conducting" read -- non-conductive --; column 3, line 6, for "becouse" read -- because --; line 11, for "arcuate" read -- accurate --.

Signed and sealed this 28th day of November 1961.

(SEAL)
Attest:

ERNEST W. SWIDER
Attesting Officer

DAVID L. LADD
Commissioner of Patents
USCOMM-DC